H. H. HARRISON.
GARMENT FASTENER.
APPLICATION FILED JAN. 18, 1909.

944,673.

Patented Dec. 28, 1909.

Witnesses:
Jas. J. Maloney

Inventor:
Henry H. Harrison
by H. J. Livermore
Atty.

UNITED STATES PATENT OFFICE.

HENRY H. HARRISON, OF BOSTON, MASSACHUSETTS.

GARMENT-FASTENER.

944,673.

Specification of Letters Patent. Patented Dec. 28, 1909.

Application filed January 18, 1909. Serial No. 472,889.

*To all whom it may concern:*

Be it known that I, HENRY H. HARRISON, a citizen of the United States, residing in Boston, in the county of Suffolk and State of Massachusetts, have invented an Improvement in Garment-Fasteners, of which the following description, in connection with the accompanying drawings, is a specification, like letters on the drawings representing like parts.

The present invention relates to a garment fastener and is embodied in a fastener of that kind in which there are two members, one provided with a socket, and the other with an engaging portion to be retained in the said socket, the fastener being especially adapted for use in connection with skirt placker to fasten the adjoining edges together.

The object of the invention is to obtain a fastener which can be easily adjusted by feeling, and at the same time is capable of securely holding the fastened edges together when the fastener has been adjusted.

Both portions of the fastener can be easily made of sheet metal by a stamping process, it being practicable to form each member by a single operation of a suitable punch and die. Each member has an elongated base portion provided with thread openings along the edges, the fastening part being raised above the base portion so as to leave a space between the said portion and the material to which it is secured. The female member of the fastener is provided with a substantially circular opening with lateral recesses, while the male member is provided with a projecting portion adapted to enter the circular opening, the said projecting member being provided with lateral extensions between the end thereof and the base of the member to enter the lateral recesses and become engaged in the socket by a half turn of one member with relation to the other.

Figure 1:
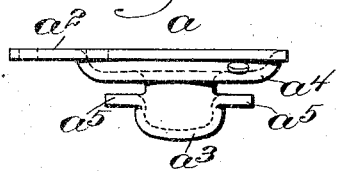
Figure 2:
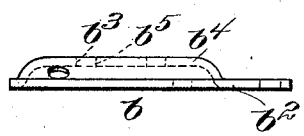
Figure 3:
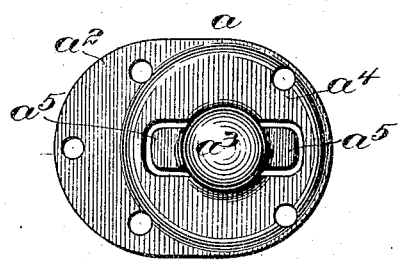
Figure 4:
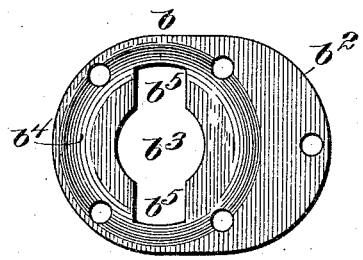
Figure 5:
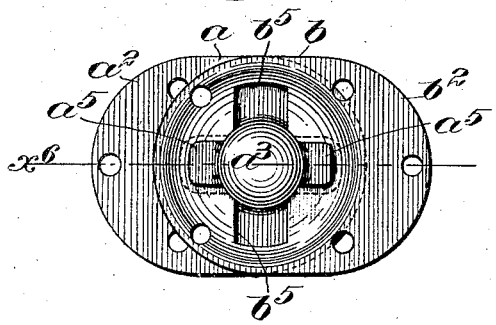
Figure 6:
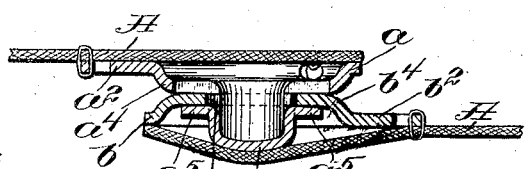

Figure 1 is a side elevation of the male member of the fastener embodying the invention; Fig. 2 is a similar view of the female member thereof; Figs. 3 and 4 are plan views of the male and female members respectively; Fig. 5 is a plan view showing the members engaged; and Fig. 6 is a longitudinal section on line $x^6$ of Fig. 5, a portion of the material to which the fastener is secured being also shown.

All of the drawings are on a very much enlarged scale, in order that the construction of the device may be clearly understood. The members $a$ and $b$ are provided respectively with flat base portions $a^2$ and $b^2$ which are shown as elongated so as to indicate the position in which the members are to be sewed along the edge of the garment A. The fastening portions are at the ends of the elongated base portion, so that the actual fastener itself will be as close as possible to the edge of the garment.

The member $b$ is provided with the opening $b^3$ which is substantially circular in shape and located in the middle of a cupped portion $b^4$, the said opening $b^3$ having lateral extensions $b^5$ to receive the fastening members of the part $a$. The said part $a$ is provided with a rounded projection $a^3$ arranged to extend into the opening $b^3$, the said projection being formed at the middle of a cupped portion $a^4$ corresponding to the cupped portion $b^4$ of the member $b$. The said projecting portion $a^3$ is provided with lateral extensions $a^5$ which are between the end of the projection $a^3$ and the portion $a^4$, the space between said projection and the portion $a^4$ being sufficient to admit the portion $b^4$ of the member $b$ when the two parts are fastened together. In fastening the two parts, it is obvious that the projection $a^3$ will freely enter the opening $b^3$ regardless of the relative positions of the two parts, and thereby center the two parts so that by merely turning one with relation to the other the right position for the full insertion of the member $a$ can be found by feeling, so that the projections $a^5$ will slip through the lateral openings $b^5$, and on turning the members will engage the under surface of the portion $b^4$, thus holding the two members together, as shown in Figs. 5 and 6.

Both members of the fastening device can be easily made by a single operation of a suitable punch and die, the member $b$, for example, having the opening $b^3$, $b^5$, punched out at the same time that the cupped portion $b^4$ is formed. In making the member $a$, a die can be employed suitably shaped to draw the cupped portion $a^4$ and the rounded projecting portion $a^3$, the die also being provided with a cutting tool adapted to cut the slots which separate the projections $a^5$ from the body of the material, and with suitable abutments to force the projections $a^5$ thus cut a short distance beyond the surface of the cupped portion $a^4$. By forming the two members with the cupped portions $a^4$ and $b^4$, recesses are formed to contain the threads, and, furthermore, the threads are protected from being cut or broken by the fastening portions of the device when the same is being fastened or unfastened.

I claim.

1. The herein described fastening member constructed of a piece of sheet metal and having an elongated base portion by which the fastener is positioned and secured to the edge of a garment, a raised cupped portion at one end of said base, and a central integral rounded projection formed at the middle of the cupped portion, the metal of the cupped portion and opposite sides of said rounded projection between the end thereof and the base of the member being cut and bent outwardly above the cupped portion to form lateral wings extending from the sides of said projection between the end thereof.

2. A garment fastener, comprising a female member having an elongated base, and a cupped portion raised at one end of said base and having a substantially circular central opening with lateral extensions, and a male member having an elongated base portion, a raised cupped portion at one end of said base, and a central integral rounded projection formed at the middle of the cupped portion, the metal of the cupped portion and opposite sides of said rounded projection between the end thereof and the base of the member being cut and bent outwardly above the cupped portion to form lateral wings projecting from the sides of said projection intermediate the end thereof and the base, the projection beyond said wings adapted to enter the circular opening in the female member to center said members, and said wings adapted to pass through the lateral extensions of said opening and then by a turn interlock with the cupped portion of said female member, the said elongated base portions serving to position and secure said members upon a garment with their fastening members close to the edge thereof.

In testimony whereof, I have signed my name to this specification in the presence of two subscribing witnesses.

HENRY H. HARRISON.

Witnesses:
M. E. COVENEY.
JAS. J. MALONEY.